B. B. NEUTEBOOM.
WHEEL.
APPLICATION FILED JUNE 16, 1917.

1,255,554.

Patented Feb. 5, 1918.
2 SHEETS—SHEET 1.

Inventor
BOUDEWIJN B. NEUTEBOOM.
By Raymond A. Parker
Attorney

UNITED STATES PATENT OFFICE.

BOUDEWIJN B. NEUTEBOOM, OF DETROIT, MICHIGAN.

WHEEL.

1,255,554.       Specification of Letters Patent.       Patented Feb. 5, 1918.

Application filed June 16, 1917. Serial No. 175,073.

*To all whom it may concern:*

Be it known that I, BOUDEWIJN B. NEUTEBOOM, a subject of the Queen of the Netherlands, residing at Detroit, county of Wayne, State of Michigan, have invented a certain new and useful Improvement in Wheels, and declare the following to be a full, clear, and exact description of the same, such as will enable others skilled in the art to which it pertains to make and use the same, reference being had to the accompanying drawings, which form a part of this specification.

My invention relates to wheels and a special object of my improvements is to provide an improved wheel for commercial vehicles that may be easily assembled, will be serviceable and in which worn parts may be easily replaced and which will increase the adaptability of the vehicle.

I secure this object in the apparatus illustrated in the accompanying drawings in which.

Figure 1:
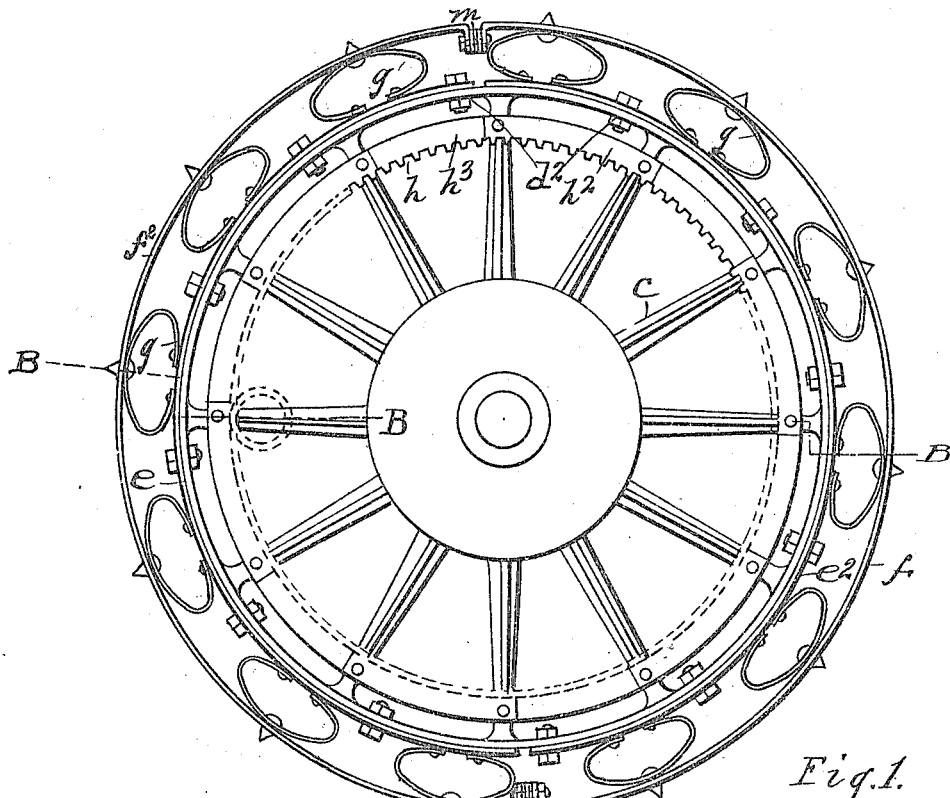
Figure 1 is a side elevation of a wheel embodying my invention.
Figure 2:
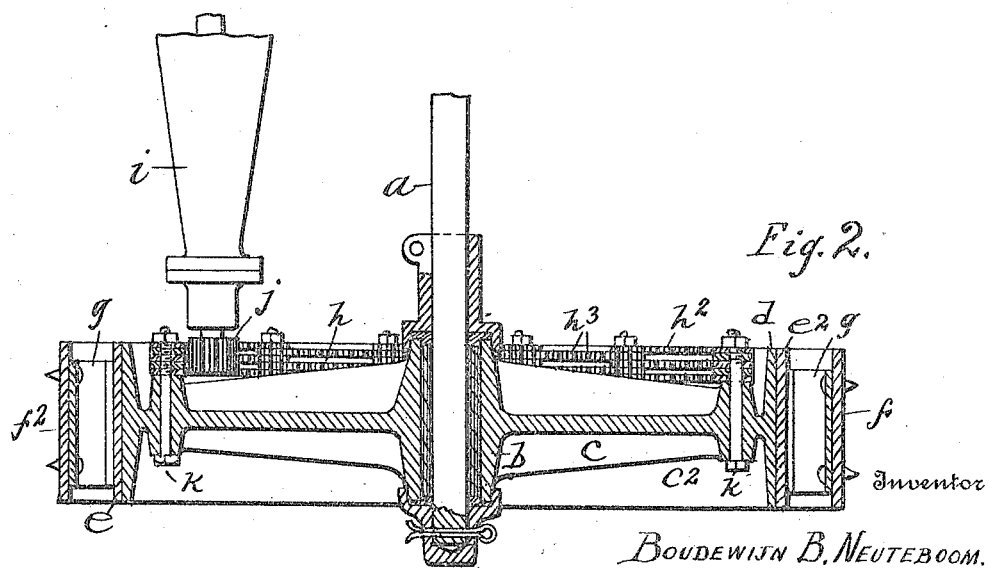
Fig. 2 is a section on the line B—B Fig. 1.
Figure 4:
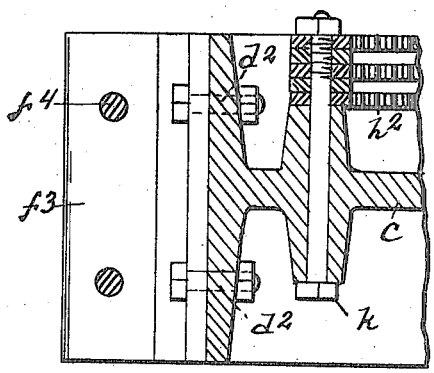
Fig. 4 is a section on the line D—D Fig. 3.
Figure 6:
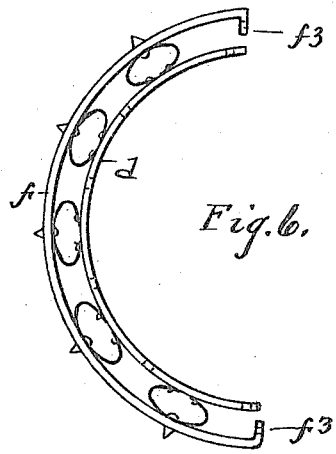
Fig. 6 is a detail view showing the adjustable tire detached from the wheel.
Figure 3:
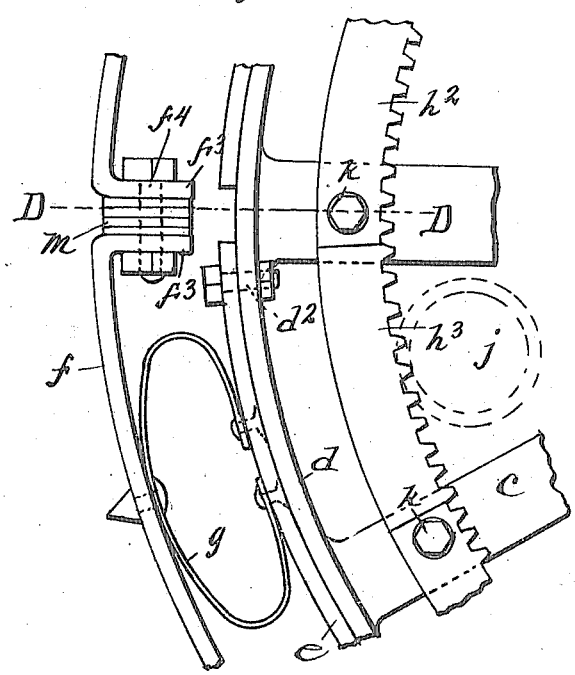
Fig. 3 is an elevation to an enlarged scale of a part of the wheel adjacent to the periphery.
Figure 5:
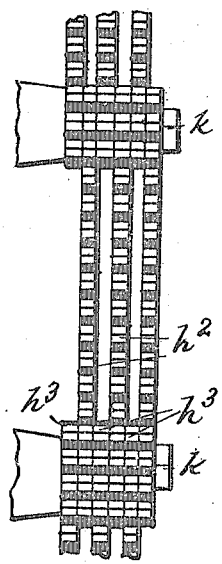
Fig. 5 is an elevation of a portion of the annular rack-bar looking at the outer edge thereof.

$a$ is the main axle and $b$ is the wheel hub bearing thereon. $c$ are spokes and $d$ is the rim of the wheel.

$h$ is an annular rack having internal gear teeth. This is secured by bolts $k$ passing through apertures in an enlarged portion $c^2$ of the spokes $c$. The rack $h$ is made up of thin rack bars $h^2$ and $h^3$ laid side by side with their teeth in line so that they may be engaged by the driving pinion $j$ extending from the counter shaft $i$. The constituent thin rack bars $h^2$ $h^3$ are made of short lengths as shown in the drawing, and the bars of one section have their ends alternating with the bars of the next section so that the constituent rack bars of each section have spaces left between them through which any foreign matter may fall and so that it shall not clog the teeth.

What I claim is:

1. In an automobile, the combination of a driving wheel, an internal gear wheel secured to said driving wheel concentric therewith, said gear wheel comprising arcuate toothed plates laid side by side and secured together, the constituent plates being spaced laterally from each other.

2. In an automobile, the combination of a driving wheel, an internal gear wheel secured to said driving wheel concentric therewith, said gear wheel consisting of toothed plates laid side by side and secured together, the constituent plates being short arcuate sections with the ends of the adjacent sections alternating so that adjacent plates are spaced from each other in a lateral direction.

In testimony whereof, I sign this specification.

BOUDEWIJN B. NEUTEBOOM.

Copies of this patent may be obtained for five cents each, by addressing the "Commissioner of Patents, Washington, D. C."